(12) United States Patent
Detlefs et al.

(10) Patent No.: US 7,866,760 B2
(45) Date of Patent: Jan. 11, 2011

(54) METHOD AND SYSTEM FOR REFILLING BRAKE CIRCUITS AFTER A LARGE CONSUMPTION OF COMPRESSED AIR

(75) Inventors: Carsten Detlefs, Ronnenberg (DE);
Heinrich Diekmeyer, Barsinghausen (DE); Frank-Dietmar Lippelt, Barsinghausen (DE); Joachim Reinhardt, Hannover (DE); Bernd Strilka, Hannover (DE)

(73) Assignee: WABCO GmbH, Hannover (DE)

( * ) Notice: Subject to any disclaimer, the term of this patent is extended or adjusted under 35 U.S.C. 154(b) by 734 days.

(21) Appl. No.: 10/565,922

(22) PCT Filed: Jul. 12, 2004

(86) PCT No.: PCT/EP2004/007651

§ 371 (c)(1), (2), (4) Date: Mar. 28, 2007

(87) PCT Pub. No.: WO2005/014358

PCT Pub. Date: Feb. 17, 2005

(65) Prior Publication Data
US 2008/0007111 A1 Jan. 10, 2008

(30) Foreign Application Priority Data
Jul. 28, 2003 (DE) .................. 103 34 317
Dec. 10, 2003 (DE) .................. 103 57 765

(51) Int. Cl.
*B60T 13/74* (2006.01)
*B60T 8/88* (2006.01)
*B60T 13/24* (2006.01)

(52) U.S. Cl. ............. 303/3; 303/9.66; 303/122.15

(58) Field of Classification Search ............. 303/3, 303/7, 9, 9.66, 10, 15, 63, 122.15; 60/404, 60/405; 417/302, 303, 304
See application file for complete search history.

(56) References Cited

U.S. PATENT DOCUMENTS
4,218,882 A 8/1980 Farr
(Continued)

FOREIGN PATENT DOCUMENTS
DE 28 21 393 A1 11/1978
(Continued)

OTHER PUBLICATIONS
Translation of EP 8678 (equivalent to DE 2837806) from EPO website. Document published Mar. 19, 1980.*
(Continued)

*Primary Examiner*—Thomas J Williams
(74) *Attorney, Agent, or Firm*—Kramer Levin Naftalis & Frankel LLP

(57) ABSTRACT

A method and system is provided for refilling vehicle operational brake circuits after a large consumption of compressed air. The operational brake circuits are compressed air consumer circuits of a consumer part of a vehicle compressed air system. The operational brake circuits also include at least one additional compressed air consumer circuit provided with a compressed air reservoir. The actual pressure values in the operational brake circuits and in the additional compressed air consumer circuit are continuously determined and compared against a lower threshold value. If the values are below the threshold value, the identified operational brake circuits are blocked as defective and communication is established between the additional compressed air consumer circuits and the intact operational brake circuits in order to refill the operational brake circuits from the compressed air reservoirs of the additional compressed air consumer circuits.

17 Claims, 2 Drawing Sheets

U.S. PATENT DOCUMENTS

| | | | |
|---|---|---|---|
| 4,484,784 A | | 11/1984 | Leiber |
| 6,089,831 A | * | 7/2000 | Bruehmann et al. ............. 303/3 |
| 6,276,761 B1 | * | 8/2001 | Beck ......................... 303/9.61 |
| 6,367,887 B1 | | 4/2002 | Sulzyc |
| 7,431,406 B2 | * | 10/2008 | Aumuller et al. .............. 303/15 |
| 2007/0096554 A1 | * | 5/2007 | Detlefs et al. ................ 303/127 |
| 2007/0246998 A1 | * | 10/2007 | Diekmeyer et al. ......... 303/9.61 |
| 2007/0262280 A1 | * | 11/2007 | Detlefs et al. .......... 251/129.01 |
| 2008/0040013 A1 | * | 2/2008 | Detlefs et al. .................. 701/78 |

FOREIGN PATENT DOCUMENTS

| | | | |
|---|---|---|---|
| DE | 2837806 A | * | 3/1980 |
| DE | 29 50 904 C2 | | 6/1981 |
| DE | 34 35 089 A1 | | 4/1986 |
| DE | 41 09 741 C1 | | 3/1992 |
| DE | 40 30 361 A1 | | 4/1992 |
| DE | 195 15 895 A1 | | 10/1996 |
| DE | 196 22 095 A1 | | 12/1997 |
| DE | 198 11 305 A1 | | 9/1999 |
| DE | 199 28 113 C1 | | 10/2000 |
| DE | 694 26 513 T2 | | 2/2001 |
| DE | 199 39 529 A1 | | 4/2001 |
| DE | 100 04 091 A1 | | 8/2001 |
| DE | 100 29 125 A1 | | 1/2002 |
| DE | 101 42 790 A1 | | 3/2003 |
| EP | 8678 A1 | * | 3/1980 |
| EP | 0 477 519 A1 | | 4/1992 |
| EP | 0 810 136 A1 | | 12/1997 |
| EP | 0 810 136 B1 | | 12/1997 |
| EP | 1 004 495 B1 | | 5/2000 |
| EP | 1 122 140 A1 | | 8/2001 |
| WO | WO 96/34785 | | 11/1996 |
| WO | WO 98/47751 | | 10/1998 |

OTHER PUBLICATIONS

EU Directive 98/12; Jan. 27, 1998.

* cited by examiner

METHOD AND SYSTEM FOR REFILLING BRAKE CIRCUITS AFTER A LARGE CONSUMPTION OF COMPRESSED AIR

BACKGROUND OF THE INVENTION

The present invention relates to a method and system for refilling brake circuits after rapid compressed air consumption.

Multi-circuit protective valves are known that divide an energy supply into several mutually independent consumer circuits and, in the event of failure of a circuit, for example by line rupture, maintain a minimum pressure in the intact circuits. If a defect allowing more air to be lost than can be refilled by the compressor occurs in a service-brake circuit, the pressure in the service-brake circuits drops mutually until the closing pressure of the valve is reached. The pressure in the defective circuit continues to drop, whereas the closing pressure is maintained in the intact circuits. While the pressure in the defective circuit continues to drop, the circuits that are still intact can be refilled by the compressor until the opening pressure of the defective circuit is reached. A dynamic equilibrium is established in which the delivered compressed air can supply the circuits that are still intact (as well as secondary consumer circuits), although at the same time air is being lost via the defect. A disadvantage of such known multi-circuit protective valves is that refilling by the compressor takes a relatively long time because the compressor has only a relatively small delivery capacity, approximately 200 to 400 liters per minute. Accordingly, the nominal energy in the brake system is restored slowly—representing a disadvantage with respect to system safety.

SUMMARY OF THE INVENTION

Generally speaking, in accordance with the present invention, a method and system are provided whereby the air pressure in vehicle brake circuits can be restored rapidly after rapid compressed air consumption.

In accordance with the present invention, the brake circuits are filled, after rapid air consumption, from a high-pressure consumer circuit in addition to the compressor. Since a high-pressure circuit can usually deliver a much larger air flow per unit time (up to several thousand liter/min.) than a compressor (approximately 200 to 400 liter/min.), the intact brake circuits are refilled much faster than merely by means of the compressor. As a result, the nominal energy in the brake system, possibly reduced by a defective circuit, can be restored in a very short time. This is particularly important after a circuit break. System safety is substantially improved by distributing the energy between the circuits. This is achieved according to the present invention by providing, for the high-pressure circuit, an electrically actuatable valve that is closed in the de-energized normal state, preferably a solenoid valve (alternatively, a pilot-controlled valve can be used), and, for the other consumer circuits, including the brake circuits, electrically actuatable valves that are open in the normal state, preferably solenoid valves. All solenoid valves are in communication with one another via a common distributor line. To fill the brake system, the solenoid valve of the high-pressure circuit is switched to open position in order to allow compressed air to flow out of the high-pressure circuit in which the pressure or the energy has been conserved via the open solenoid valves into the intact brake circuits.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangements of parts which are adapted to effect such steps, all as exemplified in the construction herein set forth, and the scope of the invention will be indicated in the claims.

BRIEF DESCRIPTION OF THE DRAWINGS

The present invention will be described in more detail hereinafter on the basis of the accompanying drawings, in which.

DETAILED DESCRIPTION OF THE PREFERRED EMBODIMENTS

Figure 1:
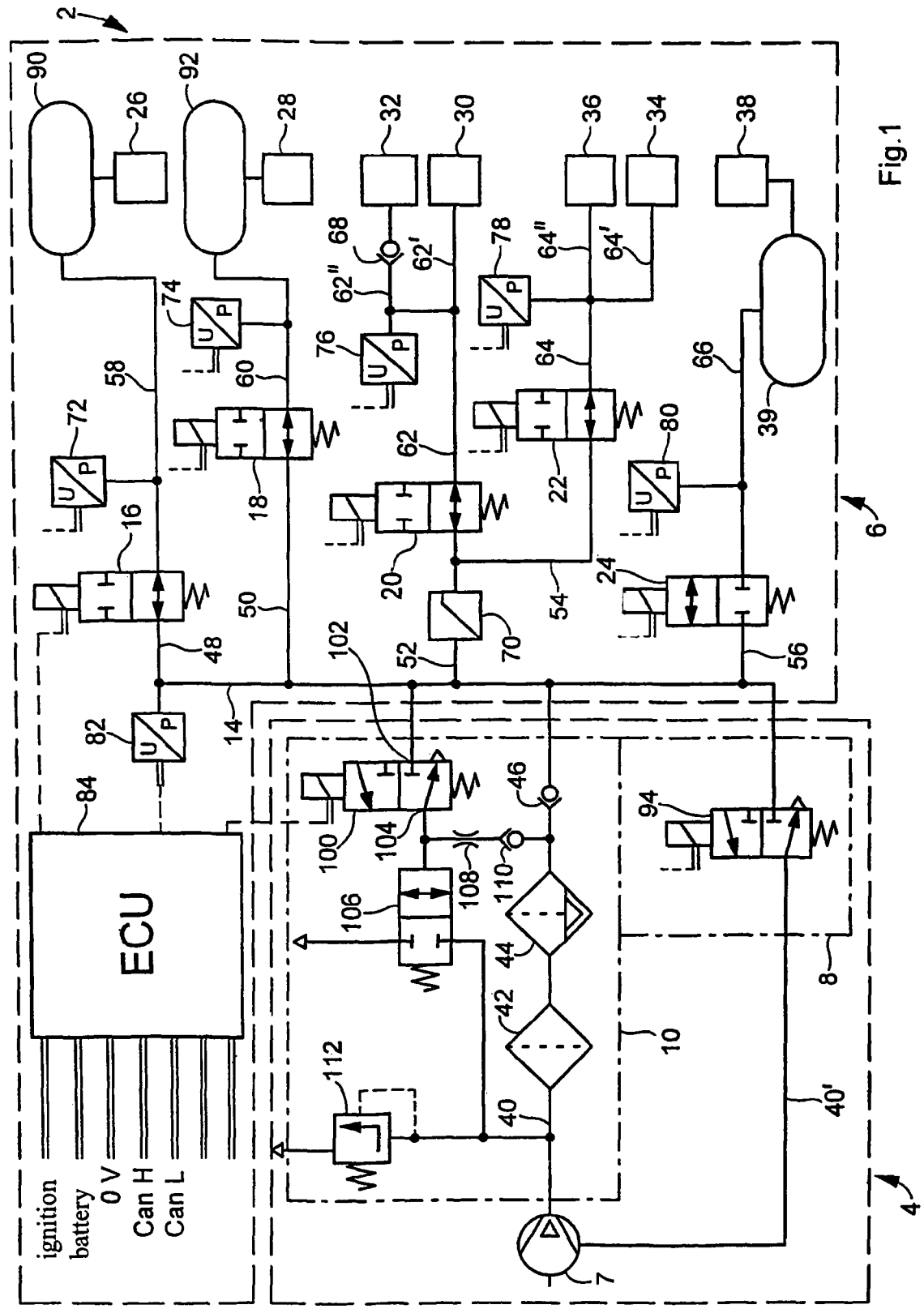
FIG. 1 is a schematic diagram of a compressed air system according to an embodiment of the present invention.

Referring now to FIG. 1, where compressed air lines are represented by solid lines and electrical lines by broken lines, there is shown a compressed air system 2 with a compressed air supply part 4 and a consumer part 6. Compressed air supply part 4 includes a compressor 7, a compressor control device 8 and an air-dryer part 10.

Consumer part 6 is provided with a compressed air distributor line 14, a plurality of electrically actuatable solenoid valves 16, 18, 20, 22, 24 with restoring springs and a plurality of compressed air consumer circuits 26, 28, 30, 32, 34, 36, 38 supplied with compressed air via the solenoid valves.

From compressor 7, a compressed air supply line 40 leads via a filter 42, an air dryer 44 and a check valve 46 to distributor line 14, from which there are branched off lines 48, 50, 52, 54, 56 leading to the solenoid valves. From the solenoid valves, compressed air lines 58, 60, 62, 64, 66 lead to the consumer circuits. Line 62 splits into lines 62' and 62" leading to circuits 30 and 32, a check valve 68 also being disposed in line 62". A pressure limiter 70 is disposed in supply line 52. Line 54, which leads to solenoid valve 22, branches off downstream from pressure limiter 70. Line 64 splits into lines 64' and 64" leading to circuits 34 and 36.

Pressure sensors 72, 74, 76, 78, 80, 82 monitor the pressure in the compressed air consumer circuits and in distributor line 14, and transmit the respective pressure as a pressure signal to electronic control unit 84, which controls the solenoid valves.

As an alternative to pressure, it is also possible to monitor other variables of state, such as air flow rate, air mass and energy, in the consumer circuits and in the connecting line.

Compressed air consumer circuits 26, 28 can be, for example, service-brake circuits. Compressed air consumer circuit 30 can be a trailer-brake circuit, in which case normally two lines, a supply line and a brake line, lead to the trailer. Compressed air consumer circuit 32 can be a parking-brake circuit with spring accumulator. Compressed air consumer circuits 34 and 36 can be secondary consumer circuits, such as operator's cab suspension, door controller, etc., in other words, all components that have nothing to do with the brake circuits. Compressed air consumer circuit 38 can be a high-pressure circuit.

Service-brake circuits 26, 28 are provided with compressed air reservoirs 90, 92 in conformity with EU Directive 98/12. High-pressure circuit 38 is provided with a compressed air reservoir 39.

The inventive compressed air system makes it possible to dispense with compressed air reservoirs in circuits 30, 32, 34, 36. As an example, it is permissible to supply other compressed air consumer circuits from the service-brake circuits (circuits 26 and 28), provided the braking function or braking action of service-brake circuits 26 and 28 is not impaired.

Via a line 40', compressor 7 is mechanically (pneumatically) controlled by compressor controller 8. Compressor controller 8 includes a solenoid valve 94 of small nominal width that can be switched by electronic control unit 84. In the de-energized normal state it is vented, as illustrated, whereby compressor 7 is turned on. If compressor 7 is to be turned off, for example because all compressed air consumer circuits are filled with compressed air, control unit 84 changes over solenoid valve 94 so that the pressure-actuatable compressor is turned off via line 40'. If solenoid valve 94 is switched to de-energized condition, for example because a compressed air consumer circuit needs compressed air, solenoid valve 94 is again switched to the normal state illustrated in the drawing, whereby line 40' is vented and compressor 7 is turned on.

Air-dryer part 10 includes a solenoid valve 100 with small nominal width. An inlet 102 is in communication with distributor line 14. A shutoff valve 106, which is in communication with supply line 40 of compressor 7 and is used for venting of the air dryer, is pneumatically switched via an outlet 104.

When solenoid valve 100 is switched to passing condition, compressor 7 no longer discharges into the consumer circuits but instead discharges to the atmosphere via valve 106. At the same time, dry air flows from distributor line 14 (out of reservoirs 90, 92 of the service-brake circuits) to the atmosphere via solenoid valve 100, throttle 108 and a check valve 110, through air dryer 44 for regeneration of its desiccant and further via filter 42 and valve 106.

Reference numeral 112 denotes an overpressure valve.

Solenoid valves 16, 18, 20, 22, 24 are controlled by control unit 84, solenoid valves 16 to 22 of compressed air consumer circuits 26 to 34 being open in de-energized normal state, while solenoid valve 24 of high-pressure circuit 38 is closed in de-energized normal state. Pilot-controlled solenoid valves can also be used. The pressure in the circuits is directly monitored at the solenoid valves by pressure sensors 72, 74, 76, 78, 80.

If the pressure were to drop in a compressed air consumer circuit, for example in circuit 30 (trailer-brake circuit), the supply of compressed air also is effected by the service-brake circuits 26 and 28 via the open solenoid valves, the pressure in secondary compressed air consumer circuits 30 to 36 being adjusted by pressure limiter 70 to a lower level, such as, for example, 8.5 bar, than the pressure level of, for example, 10.5 bar in service-brake circuits 26 and 28. High-pressure circuit 38 is normally shut off by solenoid valve 24, and therefore is not in communication with the other circuits. The high-pressure circuit usually has a higher pressure than the other compressed air consumer circuits, such as, for example 12.5 bar.

In the inventive compressed air system, the pressure in compressed air consumer circuits 26 to 38 is measured by means of pressure sensors 72 to 80, which transmit electrical pressure signals to electronic control device 84 for evaluation. The control device compares the measured pressure values with a lower threshold value, which corresponds to the pressure to be adjusted in the respective compressed air consumer circuit. If the pressure of the brake circuits drops below this threshold value due to rapid air consumption or to line rupture or break, the control device switches solenoid valve 24 of high-pressure circuit 38 to open position so that the high-pressure circuit is in communication with brake circuits 26 and 28 via connecting line 14 and open solenoid valves 16 and 18 and the energy stored in the high-pressure circuit is directed into the intact brake circuits and the intact brake circuits are refilled. At the same time, control device 84 shuts off the defective circuits by switching their solenoid valves to closed position; and compressor 7 also delivers into the intact brake circuits.

Refilling takes place very rapidly because the high-pressure circuit delivers a greater air flow per unit time into the brake circuits (up to several thousand liter/min.) than the compressor (approximately 200 to 400 liter/min.).

When the control device senses that the pressure in the high-pressure circuit and the pressure in the filled brake circuits are equal or that the index pressure value has been reached in the brake circuits, the control device closes solenoid valve 24 once again to interrupt the communication with the brake circuits.

It should be appreciated that the inventive method ensures distribution of energy between the consumer circuits, the salutary result being safe vehicle operating conditions.

Figure 2:
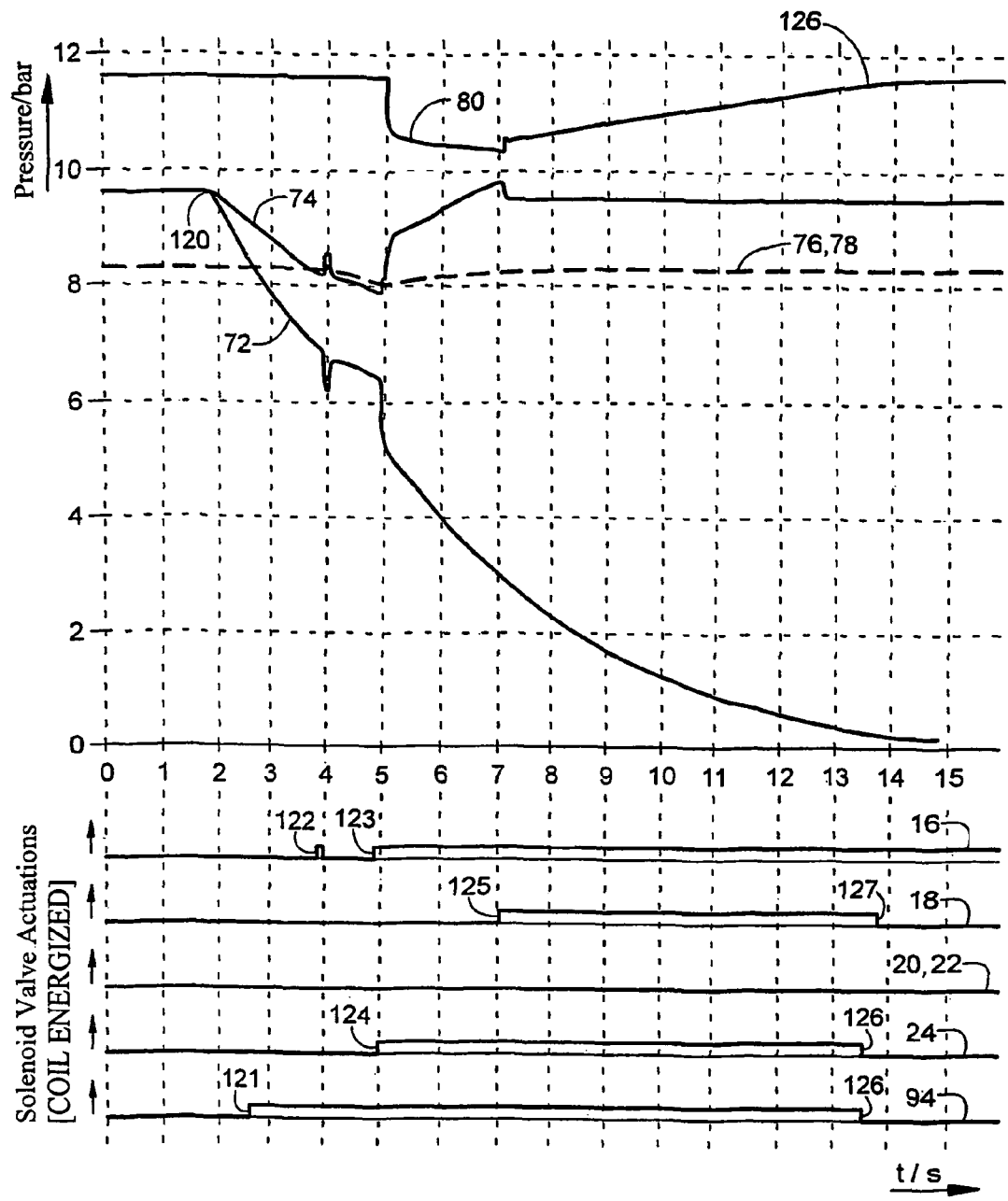
FIG. 2 is a graphical representation showing pressure variations during an operation of refilling of a brake system in accordance with an embodiment of the present invention.

Referring now to FIG. 2, the pressure variations during a brake-circuit failure due, for example, to a line break in brake circuit 26 at instant 120, and during refilling of intact brake circuit 28 at instant 124, are shown. In addition to the pressure drop in circuit 26 (see curve 72), the pressure in brake circuit 28 (see curve 74), which is in pneumatic communication, and in connecting line 14 (not illustrated) also drops. The pressure drop in connecting line 14 results in solenoid valve 94, which turns on the compressor, being actuated at instant 121. To resupply intact brake circuit 28 with air, solenoid valve 24 of high-pressure circuit 38 is switched to the open state at instant 124, and defective brake circuit 26 is closed approximately at the same time by the closing of solenoid valve 16, so that intact circuit 28, and if necessary pneumatically coupled circuits 30 and 36, which are also intact, can be rapidly resupplied with air. The pressure in circuits 30 and 36 undergoes little change during the entire venting operation since pressure limiter 70 ensures decoupling of the pressure sensors from distribution line 14 (see broken pressure curves 76, 78).

In FIG. 2, the closing of solenoid valve 16 is illustrated at an instant 123, which occurs shortly before instant 124; this is explained in greater detail hereinafter. With the opening of solenoid valve 24 of high-pressure circuit 38 and the closing of defective brake circuit 26 at instant 124, the pressure in brake circuit 28 rises very rapidly, until the pressure of the high-pressure circuit and the pressure of the brake circuit become equal or until the index pressure of the brake circuit is reached. The pressure drop in the high-pressure circuit during this rapid resupply with air can be detected at pressure sensor 80 (see drop of pressure curve 80 of high-pressure circuit 38 at instant 124). After it has been resupplied with air, circuit 28 is shut off for a certain time by switching solenoid valve 18 to blocked state at instant 125. During this time, the high-pressure circuit is refilled via the compressor, which has been switched on since the actuation of solenoid valve 94 at instant 121. To complete this refilling operation (instant 126), the control signals for solenoid valves 94 and 24 are reset once again, which means that solenoid valve 94 is electrically energized and solenoid valve 24 is switched to the closed normal state once again. Thereafter, the control signal for brake circuit 28 is also reset (instant 127), which means that solenoid valve 18 is switched to open normal state once again.

Reference numerals 122 and 123 denote two brief test blocking pulses with a duration of 0.2 sec., for example, transmitted to the control input of solenoid valve 16 before instant 124 of definitive blocking of defective circuit 26. Such test blocking pulses can be used for safe detection of the failure of a circuit (circuit 26 in this case). The test blocking pulse at instant 122 blocks solenoid valve 16 for the indicated time interval of 0.2 sec. As a consequence of this blockage, the pressure at pressure sensor 74 in unaffected brake circuit 28 rises momentarily; because pressure reservoir 92 can supply air to intact circuit 28 once again when venting is interrupted by defective circuit 26. With respect to defective circuit 26, a faster pressure drop takes place at pressure sensor 72 during the time of the test blocking pulse-since repressurization by the intact circuits is interrupted. Since the pressure drops more rapidly only in circuit 26 during the test blocking pulse, the suspicion that this circuit is defective is strengthened. In order to be certain whether this conclusion is correct, this test can be repeated by turning off valve 16 several times in pulsed manner. In the example illustrated in FIG. 2, this is done a second and third time at instant 123. The pressure again drops more rapidly in circuit 26. It is now definitively established that circuit 26 is the defective circuit. Thereafter, beginning at instant 124, circuit 26 is kept blocked.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for refilling service-brake circuits in a vehicle compressed air system after rapid compressed air consumption or loss, the method comprising the steps of:
    establishing pneumatic communication between:
        (i) intact ones of service-brake circuits of said vehicle compressed air system, wherein the service-brake circuits are included in a plurality of compressed air consumer circuits, and
        (ii) at least one additional compressed air consumer circuit including a compressed air reservoir with pressure at least equal to pressure in said intact ones of said service-brake circuits, wherein:
    said intact ones of said service-brake circuits are also in pneumatic communication with an air compressor of said vehicle compressed air system; and
    said plurality of compressed air consumer circuits having electrically actuatable valves that are open when in a de-energized normal state.

2. The method according to claim 1, further comprising the steps of:
    monitoring a variable of state in said service-brake circuits and in said at least one additional compressed air consumer circuit,
    comparing said variable of state of said service-brake circuits and of said at least one additional compressed air consumer circuit against a predefined threshold value,
    shutting off individual ones of said service-brake circuits whose variable of state is below said threshold value, and
    refilling said intact ones of said service-brake circuits from said compressed air reservoir of said at least one additional compressed air consumer circuit and from said air compressor.

3. The method according to claim 2, wherein said threshold value corresponds to a value of said variable of state to be adjusted in respective ones of said compressed air consumer circuits.

4. The method according to claim 1, further comprising the step of:
    interrupting communication between said at least one additional compressed air consumer circuit and said intact ones of said service-brake circuits when at least one of (i) a monitored variable of state of said at least one additional compressed air consumer circuit and said service-brake circuits are equal and (ii) an index value of said variable of state is reached in refilled ones of said service-brake circuits.

5. A system for refilling service-brake circuits in a vehicle compressed air system after rapid compressed air consumption or loss, the system comprising:
    a compressed air supply part including a compressor;
    an electronic control unit; and
    a plurality of compressed air consumer circuits including:
        service-brake circuits; and
        at least one additional compressed air consumer circuit; and
    wherein said service-brake circuits and said at least one additional compressed air consumer circuit each include:
        a compressed air reservoir;
        an electrically actuatable valve for supplying compressed air to its respective compressed air consumer circuit, wherein said electrically actuatable valve of said at least one additional compressed air consumer circuit is closed in a de-energized normal state, and wherein said electrically actuatable valves of said service-brake circuits are open in the de-energized normal state; and
        a sensor for monitoring pressure in its respective compressed air consumer circuit, and
    wherein said electronic control unit is operable to evaluate electrical signals from said sensors and to control said electrically actuatable valves, said electronic control unit being adapted to
        (i) compare continuously measured values of a variable of state of said service-brake circuits with a threshold value,
        (ii) shut off defective ones of said service-brake circuits whose measured values are below said threshold value, and
        (iii) while intact ones of said service-brake circuits are in pneumatic communication with said compressor, switch said electrically actuatable valves of said at least one additional compressed air consumer circuit to an open position to establish communication between said at least one additional compressed air consumer circuit and said intact ones of said service-brake circuits to refill said intact ones of said service-brake circuits from said compressor and from said compressed air reservoir of said least one additional compressed air consumer circuit.

6. The system according to claim 5, wherein said electronic control unit is adapted to switch said electrically actuatable valves of said defective ones of said service-brake circuits to a closed position when a rapid drop of said variable of state occurs.

7. The system according to claim 5, wherein a pressure level in said at least one additional compressed air consumer circuit is higher than said pressure level in said service-brake circuits.

8. The system according to claim 5, wherein said electrically actuatable valves of said service-brake circuits are connected to a common compressed air distributor line, said common compressed air distributor line being in communication with a compressed air supply line, said compressed air supply line being in communication with said compressor.

9. The system according to claim 5, wherein said electronic control unit is adapted to close said electrically actuatable valve of said at least one additional compressed air consumer circuit when at least one of (i) said variables of state of said at least one additional compressed air consumer circuit and said variable of state of said intact ones of said service-brake circuits are equal and (ii) said variable of state of said service-brake circuits has reached an index value.

10. The system according to claim 5, wherein said threshold value corresponds to a value of said variable of state to be adjusted in said intact ones of said service-brake circuits.

11. The system according to claim 5, wherein said electrically actuatable valves are solenoid valves.

12. The method according to claim 2, wherein said variable of state is at least one of pressure, air flow rate, air mass and energy.

13. The system according to claim 5, wherein said variable of state is at least one of pressure, air flow rate, air mass and energy.

14. The method of claim 1, further comprising the step of:
decoupling at least one defective circuit of said service-brake circuits from said intact ones before the step of establishing pneumatic communication.

15. The method of claim 14, wherein the decoupling step comprises:
determining whether pressure in said at least one defective circuit has dropped;
testing said at least one defective circuit to identify whether a pressure drop indicates that said at least one defective circuit has failed; and
when said at least one defective circuit has failed, decoupling said at least one defective circuit from said intact ones.

16. The method of claim 15, wherein testing said at least one defective circuit comprises:
briefly decoupling and re-coupling said at least one defective circuit from said intact ones;
determining whether said pressure in said intact ones has risen in response to the step of briefly decoupling and re-coupling; and
in response to determining whether said pressure in said intact ones has risen, identifying whether said at least one defective circuit has failed.

17. The method of claim 16, wherein the step of briefly decoupling and re-coupling comprises:
decoupling said at least one defective circuit from said intact ones for about 0.2 seconds.

\* \* \* \* \*